UNITED STATES PATENT OFFICE.

ADOLF KAYSER, OF BUFFALO, NEW YORK.

PROCESS OF SEPARATING ALUMINA FROM SILICA.

SPECIFICATION forming part of Letters Patent No. 708,561, dated September 9, 1902.

Application filed September 5, 1901. Serial No. 74,450. (No specimens.)

*To all whom it may concern:*

Be it known that I, ADOLF KAYSER, a citizen of the United States, residing at Buffalo, in the county of Erie and State of New York, have invented new and useful Improvements in the Process of Making Alumina, of which the following is a specification.

The object of my invention is the utilization of natural deposits of marl, which are frequently found in abundance in calcareous regions, as raw material for the production of alumina and hydraulic cement. Marl, which is suitable for this purpose, is composed mainly of calcium carbonate and aluminium silicate, and as the same is naturally found in a pulverulent or finely-divided state it is well and economically fitted for subsequent treatment according to my process.

I have demonstrated by practical tests that the best results are obtained when the material after eliminating water and carbonic acid therefrom analyses approximately as follows: alumina, eighteen per cent.; silica, twenty-eight per cent.; calcium oxid, fifty-four per cent. The natural deposits of marl vary more or less, and if the constituents of the available marl are not combined approximately in the proportions above specified it becomes necessary to correct or adjust the composition by mixing or blending with the material a suitable quantity of clay if too calcareous or a suitable quantity of calcareous material if the proportion of clay is excessive.

In practicing my process, marl of approximately the composition above specified is mixed with sodium carbonate in about the proportion of one hundred pounds of marl and thirty-four pounds of sodium carbonate, or, in other words, about three parts of marl to one part of sodium carbonate. If the calculation is based on crude material containing water and carbonic acid, a corresponding allowance must be made. If a material richer in alumina than clay is available—such, for instance, as bauxite—it is advantageous to increase the percentage of alumina in the above composition, the amount of soda being in that case also increased in the proper proportion. This mixture is next ignited to a fusing or cindering temperature, which step is best carried out in a revolving furnace of any well-known construction. During this stage of the process care must be taken to avoid any loss of sodium by the reducing action of fire-gases when the combustion is incomplete, and it is therefore advisable to admit a small excess of air to the furnace to insure a complete combustion of the fuel. The resulting cinder or product has approximately the following composition: sodium oxid, seventeen per cent.; aluminium oxid, fifteen per cent.; silica, twenty-three per cent.; calcium oxid, forty-five per cent. This cinder is next disintegrated to fragments of about pea size and then leached in any well-known manner. From twenty-six to twenty-seven per cent. of the weight of the cinder is thereby dissolved, forming a lye of sodium aluminate, while calcium silicate remains as a residue.

From an examination of the above figures it will be observed that in both salts—sodium aluminate and calcium silicate—two molecules of the bases—soda and lime—are combined with one molecule of the corresponding acids—alumina and silica—or very nearly so, and the essence of my invention lies in this proportion between the acid and base in each salt; but the proportion between the two salts may vary widely under different conditions. The formulas of the salts may be expressed as $Al_2O_3 2Na_2O$ and $SiO_2 2CaO$; but the formula of the product under varying conditions would be $x(Al_2O_3 2Na_2O) + y(SiO_2 2CaO,)$ and the above percentages, showing the composition of the finished product, are given only as an example of a practical case.

To purify the solution of sodium aluminate, about one-tenth of one per cent. of milk of lime is added to the solution while agitating the same. The lye is thereby clarified and is practically free from oxid of iron, silica, and titanic acid. The lye is treated in a well-known manner with carbonic acid, which may be economically derived from the revolving furnace, producing alumina and sodium carbonate. The latter may be evaporated by the waste heat from the furnace, and the resulting soda is used over again. The leached residue retains between one and two per cent. of soda and about three per cent. of alumina, but is composed mainly of calcium silicate, which is a raw material for the manufacture of hydraulic cement. This material, however, contains an excessive proportion of acids for this purpose, and in order to render the same available it is necessary to add sufficient calcareous material to obtain the proper proportions.

It has been found that the presence of a small amount of magnesium carbonate, though undesirable, does not seriously affect the ultimate product; but the use of marl containing more than five per cent. of such material should be avoided. It is also advisable to employ marl which contains a minimum quantity of iron.

My process not only permits the utilization of the cheapest aluminous material which nature yields in abundance, but extracts over eighty per cent. of the alumina contained in the raw material. It also permits the use of common clay, which is abundant and considerably cheaper than fire-clay or bauxite.

When the cinder contains an excess of lime or calcium oxid, the excess is not held and protected by silica and the aluminium oxid diminishes in quantity by contact with the residue. In my process the proportion of calcium oxid in the cinder is such that all of the same is held by the silica, thus avoiding diminution of the percentage of aluminium oxid. An excess of calcium oxid also increases the infusibility of the compound, requiring a higher cindering temperature. In my process only such a percentage of calcium oxid is employed as is sufficient to accomplish the desired result. The compound can therefore be cindered at a lower temperature, and a corresponding saving in fuel is effected. When an excess of silica is present, the cinder becomes more and more glassy with the increase of silica, and the percentage of alumina which can be leached out of the lye diminishes accordingly. This action cannot be corrected by increasing the amount of alkali, because in the latter case sodium silicate is formed, which acting ultimately on the sodium aluminate lye will at once precipitate hydrous aluminium silicate, and therefore cause a corresponding loss of alumina.

While the utilization of marl of approximately the composition hereinbefore specified is the leading object of my improvement, the novel feature of the process resides in mixing sodium carbonate with such marl or its equivalent substances—aluminium silicate and calcium carbonate—in the proportions mentioned and then cindering the mixture, whereby the resulting salts contain two molecules of the bases—soda and lime—for one molecule of the corresponding acids, alumina and silica.

I claim as my invention—

1. The process of separating alumina from silica, which consists in heating a mixture, containing alumina, silica, lime and soda in the proportion of two molecules of soda to one molecule of alumina and two molecules of lime to one molecule of silica, to a cindering temperature and leaching out the aluminate of soda thus formed; substantially as described.

2. The process of separating alumina from silica, which consists in heating a mixture, containing alumina, silica, lime and soda in the proportion of two molecules of soda to one molecule of alumina and two molecules of lime to one molecule of silica, to a cindering temperature, leaching out the aluminate of soda thus formed and recovering the alumina from the solution; substantially as described.

3. The process of recovering alumina from marl containing approximately, alumina eighteen per cent., silica twenty-eight per cent., calcium oxid fifty-four per cent., which consists in mixing it with carbonate of soda in the proportion of about one hundred pounds of marl to thirty-four pounds of carbonate of soda, heating to the cindering temperature, leaching and recovering the alumina from the resulting solution; substantially as described.

Witness my hand this 31st day of August, 1901.

ADOLF KAYSER.

Witnesses:
CARL F. GEYER,
THEO. L. POPP.